United States Patent [19]

Sandgren

[11] Patent Number: 5,370,401
[45] Date of Patent: Dec. 6, 1994

[54] ANTIROTATIONAL AND AXIAL FORCE COMPONENT IN A PUSHER SEAL ASSEMBLY AND TOOL FOR WEAR INSTALLATION

[75] Inventor: Jan E. Sandgren, Providence, R.I.

[73] Assignee: EG&G Sealol, Inc., Cranston, R.I.

[21] Appl. No.: 191,144

[22] Filed: Feb. 3, 1994

Related U.S. Application Data

[63] Continuation of Ser. No. 906,836, Jun. 30, 1992, abandoned.

[51] Int. Cl.⁵ .............................. F16J 15/38
[52] U.S. Cl. ........................... 277/1; 277/9.5; 277/81 S; 277/88
[58] Field of Search ............... 277/9, 9.5, 81 S, 81 R, 277/11, 82-88, 90, 192, 195, 197, 199, 42

[56] References Cited

U.S. PATENT DOCUMENTS

| | | | |
|---|---|---|---|
| 2,294,105 | 8/1942 | Wallgren | 277/88 |
| 2,608,425 | 8/1952 | Krug | 277/89 |
| 3,025,070 | 3/1962 | Copes | 277/81 S |
| 3,751,049 | 8/1973 | Busby et al. | 277/85 |
| 4,410,188 | 10/1983 | Copes | 277/81 S |
| 4,575,098 | 3/1986 | Escue | 277/81 R |
| 4,576,384 | 3/1986 | Azibert | 277/81 S |

*Primary Examiner*—William A. Cuchlinski, Jr.
*Assistant Examiner*—Daniel G. DePumpo
*Attorney, Agent, or Firm*—Finnegan, Henderson, Farabow, Garrett & Dunner

[57] ABSTRACT

In a split mechanical face seal including means for biasing one split seal face against another, an annular, inwardly radially extending leaf spring, which may also be split, is mounted at an outer diameter thereof to the stationary seal housing. A radially inward end of the spring is received in a notch in the stationary seal ring axially remote from the sealing face. The spring end biases the seal face toward a non-resiliently mounted rotating face and retains the stationary sealing face against rotation. A tool in the form of a U-shaped collar is provided for holding two split ring seal halves for preventing grinding motion at their mating surfaces during installation.

20 Claims, 6 Drawing Sheets

ANTIROTATIONAL AND AXIAL FORCE COMPONENT IN A PUSHER SEAL ASSEMBLY AND TOOL FOR WEAR INSTALLATION

This application is a continuation, of U.S. application Ser. No. 07/906,836, filed Jun. 30, 1992, now abandoned.

BACKGROUND OF THE INVENTION

The present invention relates to mechanical split seals for sealing along a shaft.

Many forms of pumps operate in an environment in which a rotating shaft must be sealed around its periphery to prevent fluids from entering into or exiting from a housing. Split seals comprise a plurality of elements surrounding a shaft rather than one solid annular piece. Replacement may be accomplished without having to slide the seal elements off of the shaft or disassembling other apparatus to permit removal of a solid seal. Split seal elements are simply disassembled and removed from around the shaft. There are typical applications in which replacement of a solid seal could take eight to twenty four hours, while replacement of a split seal might take one hour.

Normally two opposing split seal rings are provided. One is stationary (i.e., non-rotating), and the other rotates. Commonly, two halves each subtending 180° constitute each seal ring. In the form of split seal known as a pusher seal, some movement on the part of the non-rotating seal is permitted. Hydraulic pressure during operation urges the non-rotating seal ring toward the rotating ring. Additionally, biasing means provide spring force to press against the non-rotating seal ring. Hence, two functions must be provided to achieve desired operation. The non-rotating seal ring must be retained to be held in place against the rotating seal ring, and the biasing means must be mounted in a stationary assembly.

In prior art embodiments, a pin is used to retain the non-rotating seal ring with respect to a stationary housing. A slot must be machined into the non-rotating sealing ring centered at a particular circumferential position, and another slot must be machined in the stationary housing that will have to be placed in registration with the slot in the non-rotating sealing ring so that the pin can be inserted to achieve its intended function. One common form of biasing means comprises a plurality of coil springs mounted in an angularly displacement from each other, and each mounted in an axial orientation. Machining for proper mounting of these components must be provided for in the design of the seal assembly. Assembly of the components may be complex. A great deal of manipulation of components may be required. Split seals are often formed by cracking a finished seal ring. Relatively fine grained material will lack the interlocking characteristic of a coarser material. Handling such material without damage to the radially extending surfaces that must mate is difficult. Simplified fixturing means have not customarily been utilized.

SUMMARY OF THE INVENTION

It is therefore an object of the present invention to provide a pusher seal in which a single component is utilized for retaining a non-rotating sealing ring against rotation and for urging the non-rotating sealing ring against an opposed, rotating sealing ring.

It is also an object of the present invention to provide a subassembly in a pusher seal which provides a simplified construction for retaining a non-rotating sealing ring against rotation and urging the non-rotating sealing ring against an opposed, rotating sealing ring.

It is a further object of the present invention to provide a tool for simplified assembly of a pusher seal assembly constructed in accordance with the present invention.

Briefly stated, in accordance with the present invention, there is provided in a pusher seal comprising opposing stationary and rotating split sealing rings, and a biasing means, preferably in the form of a split annular leaf spring, for biasing the stationary ring in an axial direction and for constraining the stationary ring from rotation. An outer diameter of the annular leaf spring is supported in a stationary gland housing, and surrounds a shaft and the stationary split sealing ring in a radial dimension. Slots are formed in the stationary seal ring remote from the sealing surface. Each slot subtends a preselected arc on the surface of each split seal half and extends axially inwardly to define a recess which will receive an end of each leaf spring. The leaf spring ends prevent rotation of the non-rotating seal halves. A tool in the form of a U-shaped collar is provided for holding the two split ring seal halves for preventing grinding motion at their mating surfaces. Such tool a may be used to install a rotating split ring and removed prior to operation.

BRIEF DESCRIPTION OF THE DRAWINGS

The means by which the foregoing objects and features of invention are achieved are pointed out in the claims forming the concluding portion of the specification. The invention, both as to its organization and manner of operation, may be further understood by reference to the following description taken in connection with the following drawings.

Of the drawings.

DESCRIPTION OF THE PREFERRED EMBODIMENTS

Figure 1:
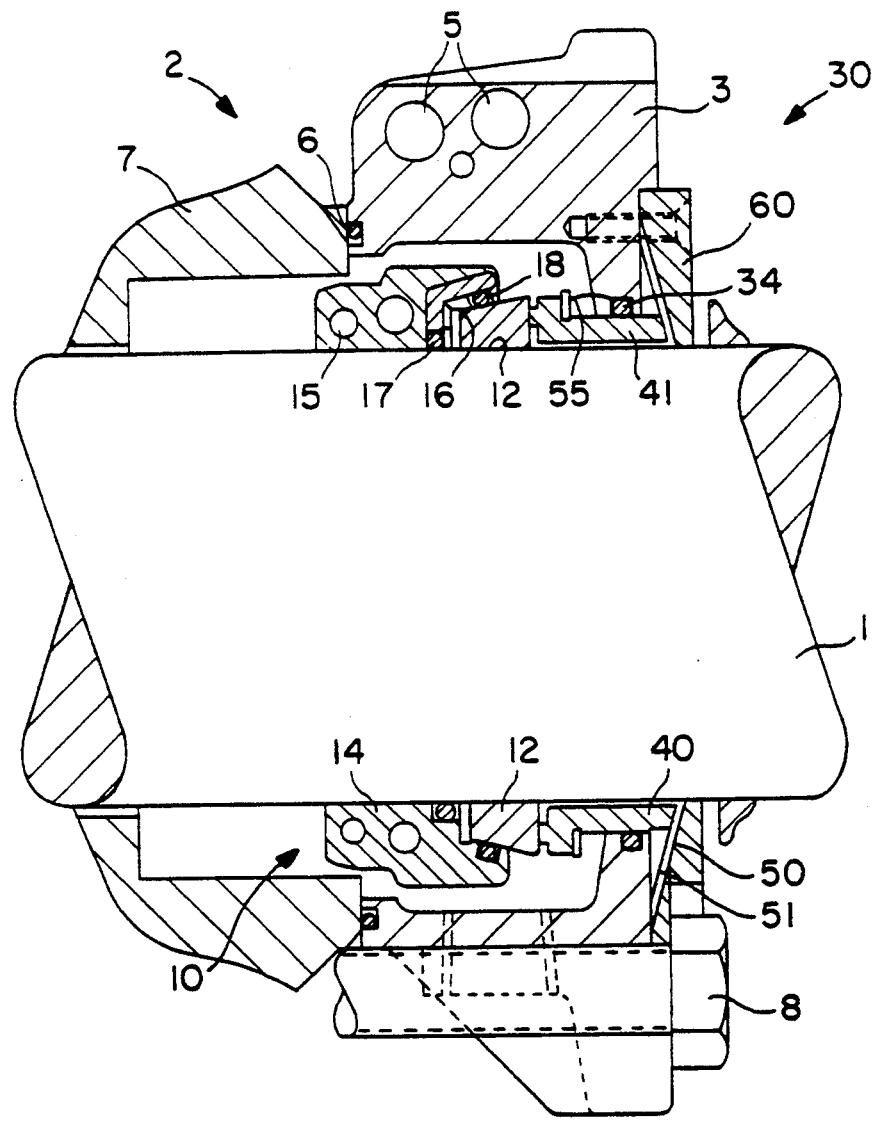
FIG. 1 is a cross-section of an elevation of a seal constructed in accordance with the present invention.

Referring now to FIGS. 1, there is illustrated, in cross-sectional form and exploded axonometric form respectively, a seal constructed in accordance with the present invention. In the present description, each split component is comprised of halves, and the reference numeral describing each split component refers to both half portions. A shaft 1 is sealed in a stationary housing 2 comprising a gland 3. The gland 3 is retained to conventional stationary means, e.g. a pump housing (not shown), in a conventional manner. The gland may be split into 180° portions and fastened to each other with socket head cap screws 5. Gland packing 6 at an axial end of the gland 3 may seal the gland against a cap 7 through which the shaft 1 projects. A cap screw 8 extends axially to retain the cap 7 affixed to the gland 3.

Figure 2:
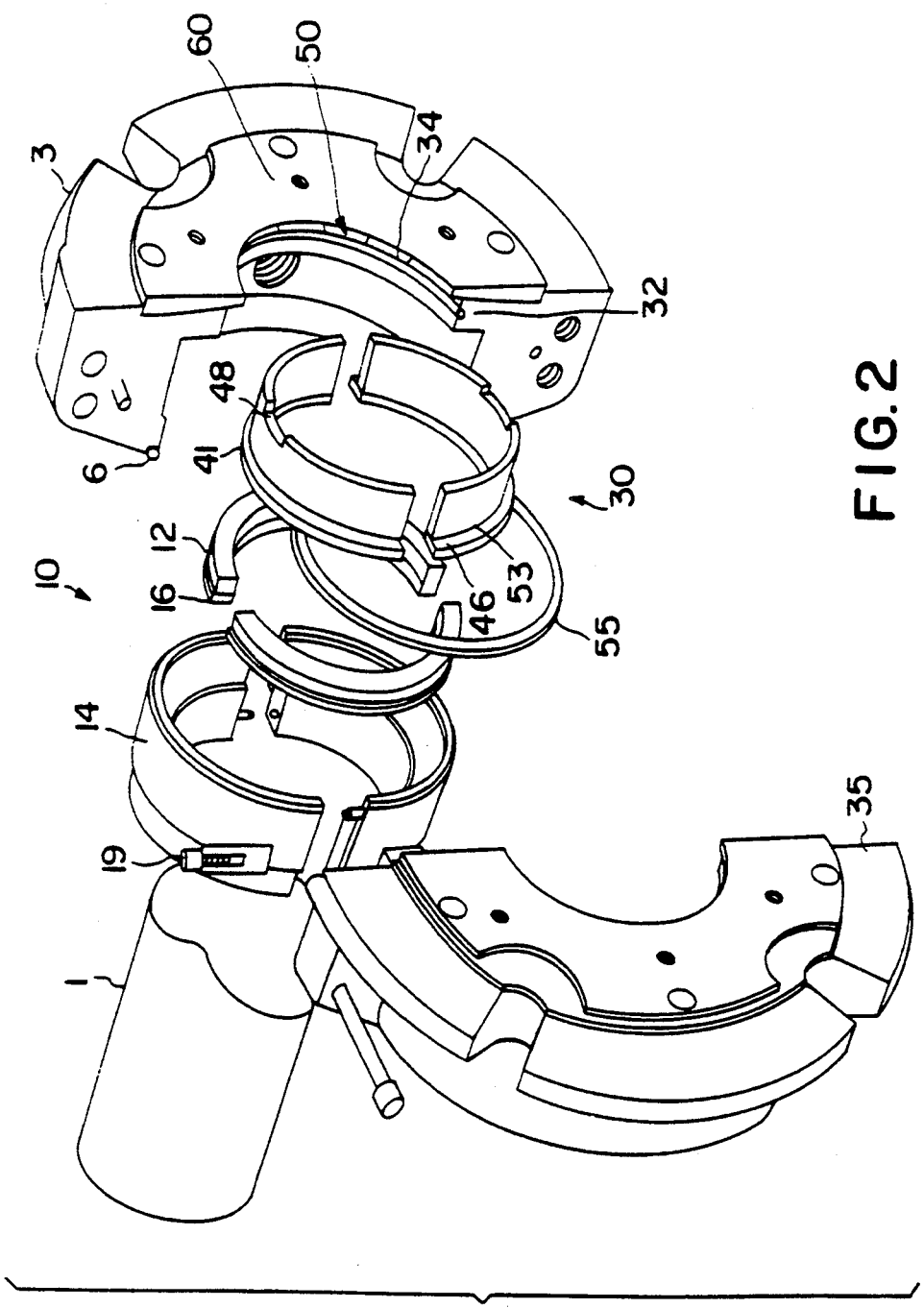
FIG. 2 is an exploded, axonometric view of the apparatus of FIG. 1.
Figure 3:
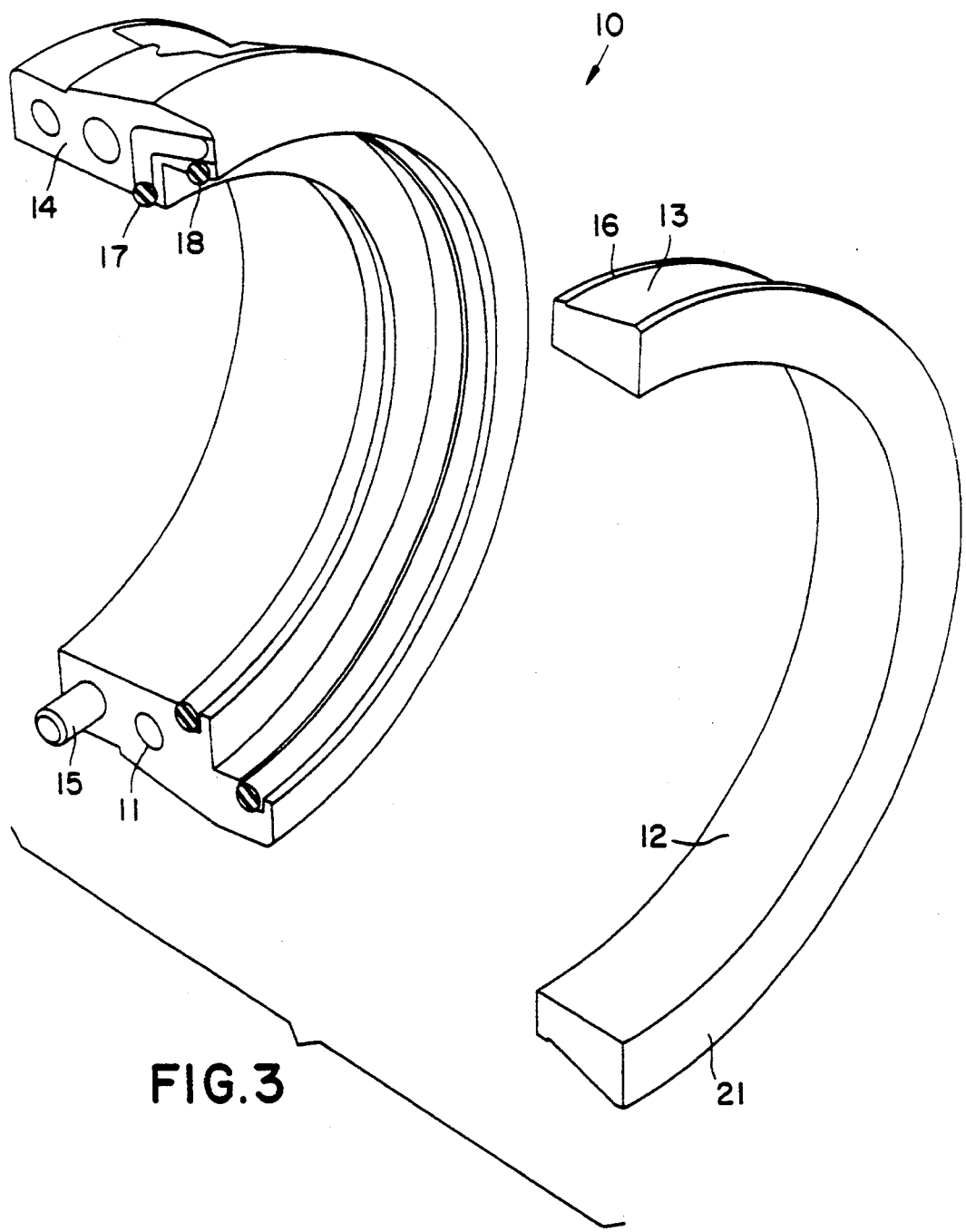
FIG. 3 is an exploded, axonometric view of a rotating seal half.

A rotating seal assembly 10 is mounted to the shaft 1 for holding a split rotating face seal 12. In the present description, the rotating face seal 12 will be referred to as the mating ring 12. Either the rotating face seal 12 or the stationary face seal, i.e., non-rotating face seal 40 (described below) may be referred to as a wear ring. The assembly 10 is described with respect to FIG. 3, which is an exploded, axonometric view of a rotating seal half, as well as with respect to FIGS. 1 and 2. The same reference numerals are used to represent corresponding components. The mating ring 12 may be mounted directly on the shaft 1, but is more commonly installed on a packing sleeve.

In the present embodiment, the mating ring 12 is received in a housing comprising a split mating ring adapter 14 mounted to the shaft 1. Alignment pins 15 are received respectively in alignment apertures 11 of mating ring adapter halves 14. Mating ring adapter packing O-rings 17 and 18 on an inner diameter of the mating ring adapter 14 surround the shaft 1 and an axial midpoint of the outer diameter of the mating ring 12 respectively. Screws 19 fasten the halves 14 together.

In the present embodiment, both the inner diameter of the chamber portion of the mating ring adapter 14 receiving the mating ring 12 and the outer diameter of the mating ring 12 are tapered, for example at 15°. The mating ring 12 is thus supported in a self-aligning relationship, and the outer circumferential surface 13 thereof bears against the inner diameter of the mating ring adapter 14. The sealing surface 21 of the mating ring 12 has the largest radial dimension, and is wider than the O-ring 18. A circumferential ridge 16 is provided at the axially remote end of the mating ring 12 opposite the sealing surface 21 to have a larger diameter than the inner diameter of the O-ring 18 in its uncompressed state. This facilitates retaining the mating ring 12 in the mating ring adapter 14.

Figure 4:
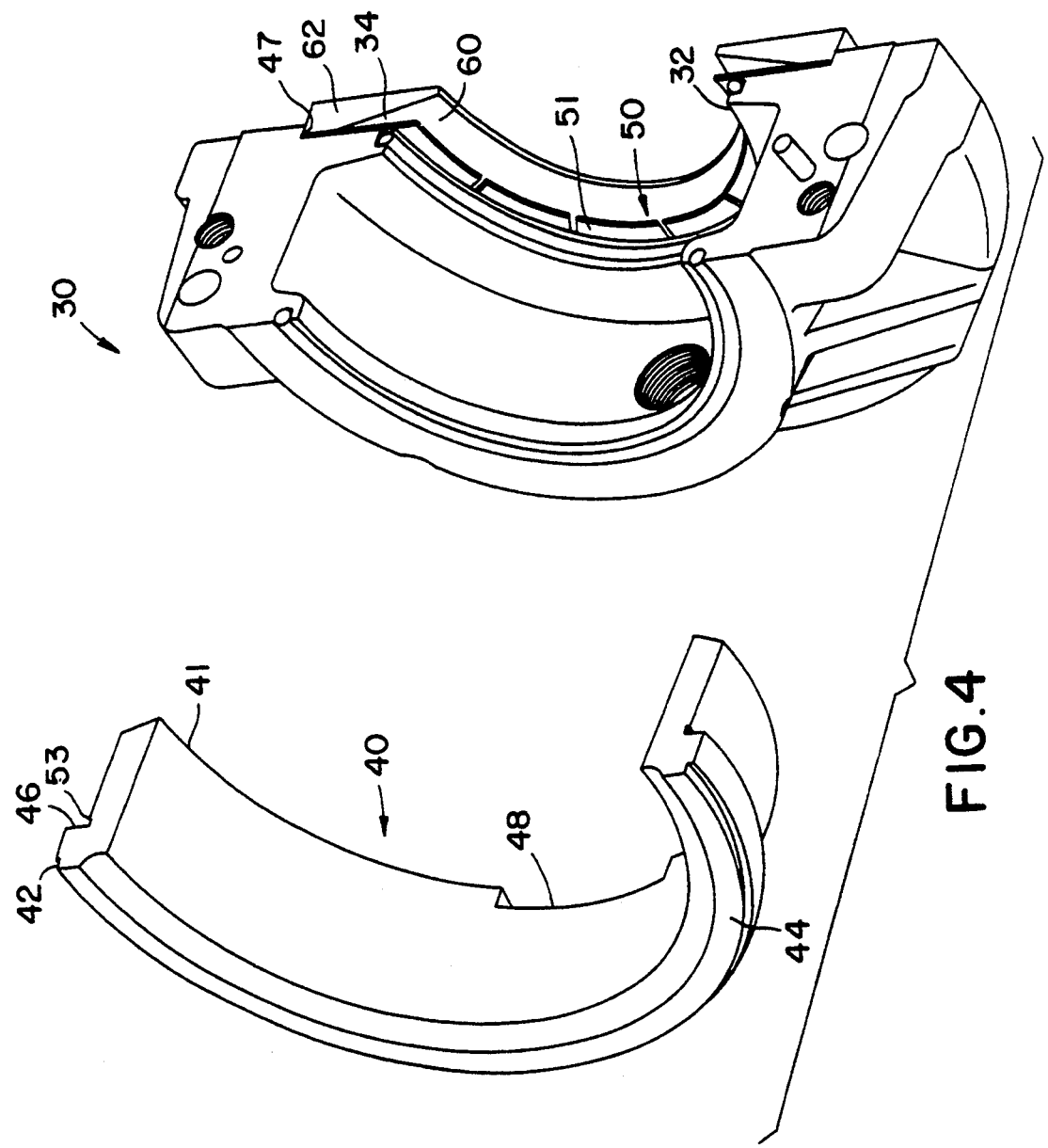
FIG. 4 is an axonometric view of a stationary seal half.

A stationary seal assembly 30 is defined within the gland 3. The stationary seal assembly is described particularly with respect to FIG. 4, which is an axonometric view of an exploded stationary seal half, as well as FIGS. 1 and 2. A radially inwardly directed circular flange 32 having a packing O-ring 34 on an inner diameter thereof defines a circular opening receiving a split stationary seal 40 and defines a housing therefor holding the seal 40 in radial compression. In the present description, the stationary seal 40 will also be called the insert 40. The insert 40 has a cylindrical body 41 which is axially movable in the flange 32. A seal portion 42 extending radially outwardly from the cylindrical body 41 has a sealing face 44 disposed for engagement with the mating ring 12. At the intersection of a surface 46 of the seal portion 42 axially opposite the seal face 44 and the cylindrical body 41, a circumferential notch 53 is formed. A retaining ring 55, which is dimensioned to fit into the notch 53 and has deformable movement is used to hold the insert halves of the non-rotating face seal 40 together. The retaining ring 55 may be snapped into the notch 53 in a conventional manner.

The insert halves of the non-rotating face seal 40 each have means removed from the seal face 44 for receiving biasing means. In the preferred embodiment, notches 48 are formed in the cylindrical body halves 41 of the non-rotating face seal 40 at their ends axially remote from the sealing face 44 for receiving the biasing means.

Figure 5:
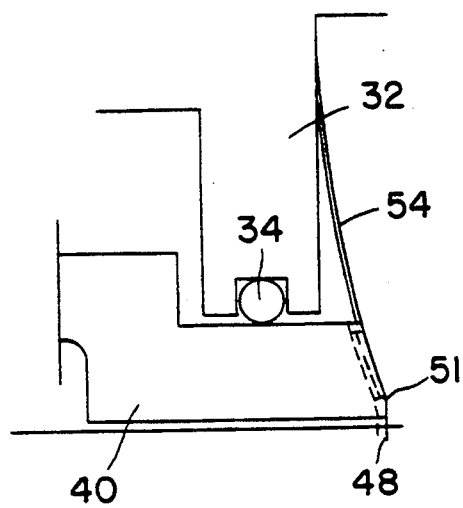
FIG. 5 is a partial cross-sectional view of a stationary seal half assembled in the stationary housing.
Figure 6:
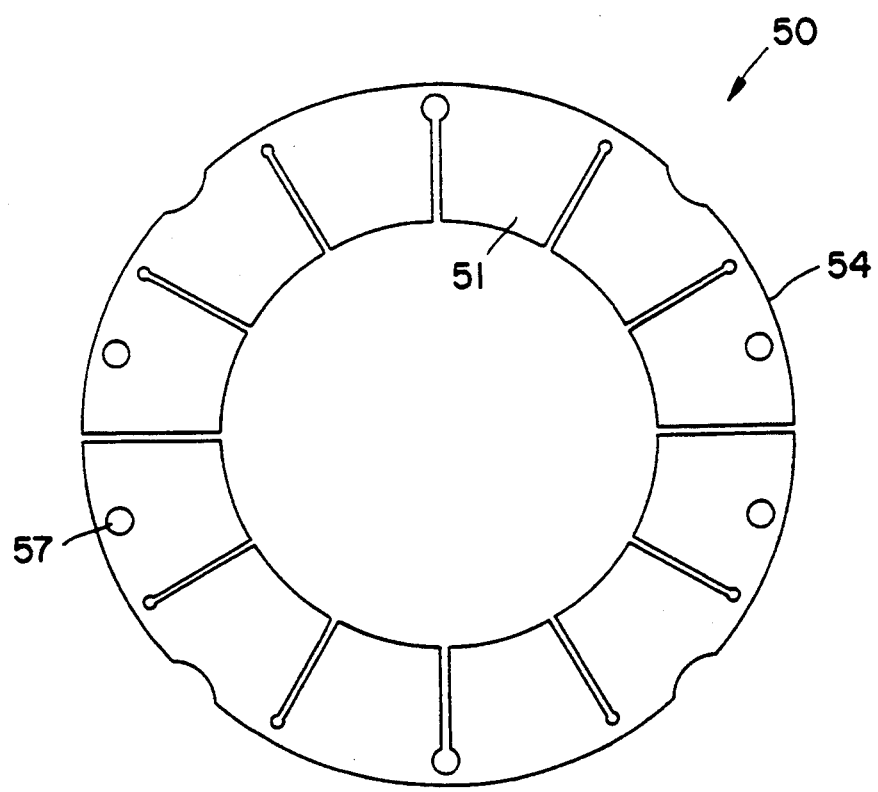
FIG. 6 is plan view of one form of a finger spring for retaining and biasing the non-rotating seal halves.

The biasing means 50 is provided mounted in an annular recess 47 in the gland 3 surrounding the cylindrical body 41 for bearing against the insert 40 to bias the insert 40 toward the mating ring 12, as seen in FIG. 5. In the preferred embodiment, the biasing means 50 comprises a split annular finger spring 54, in the form of a diaphragm spring, having radially inwardly extending segments or fingers 51 that may be of equal dimensions and that are separated by radial grooves. The split annular finger spring 54 is illustrated in a plan view in FIG. 6. Holes 57 receive fastening means as further described below. In the preferred form, each notch 48 in the cylindrical body 41 has an angular dimension for receiving one spring finger 51 after assembly. In one nominal embodiment, the notch 48 may have an axial depth of $\frac{1}{4}$ inch. Other embodiments have been achieved in which a notch depth of 0.050" has been sufficient to receive a spring finger 51 to retain the insert 40 against rotation.

The annular finger spring 54 is mounted in the annular recess 47 by an annular, split spring retainer ring 60 dimensioned to have an outer annular portion 62 for compressing the radially outer end of the spring 54 against the gland 3. The axially inner, i.e. in the direction toward the sealing face 44, portion of the spring retainer 60 defines a recess into which the spring 54 may project and have room to flex toward and away from the rear surface of the gland 3 to permit axial movement of the insert 40.

Figure 7:
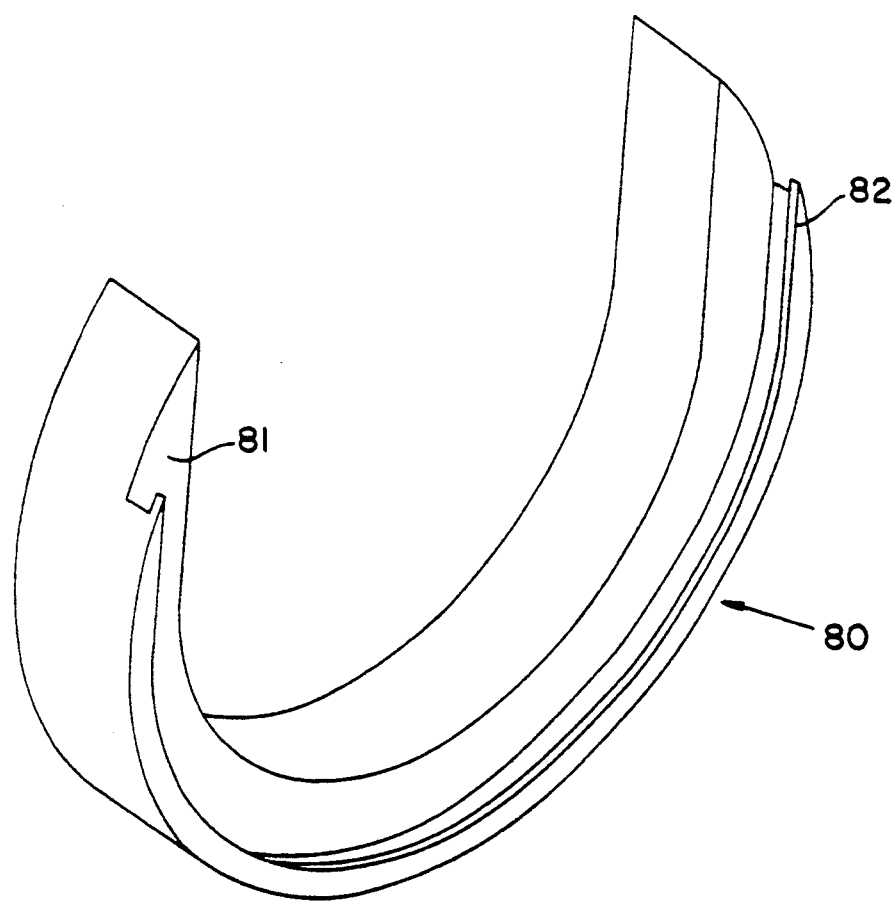
FIG. 7 is an axonometric view of an installation tool for use in accordance with the present invention.

For handling the split seal components 12 or 40, a tool 80 is provided. The tool 80 comprises a substantially U-shaped collar preferably symmetrical with respect to an axis with an axially extending flange of L-shaped cross section adapted to grasp the outer diameter of the split seal halves of either the face seal 12 or the non-rotating face seal 40, as shown in FIG. 7. The tool 80 permits the halves of the mating ring 12 or insert 40 to be held together without relative motion while each seal element is handled for assembly. The tool 80 may be deformable to the extent that it deforms to receive an outer diameter of the mating ring 12 or insert 40 while compressing the halves together. In one form, the tool 80 has a surface 81 for bearing against the sealing surface of the mating ring 12. A circumferential flange 82 depends therefrom for grasping the outer surface 13 of the mating ring 12 at a portion having a lesser diameter than the greatest diameter, at which the tool 80 engages the mating ring 12. In use, the tool 80 is moved in a transverse direction, i.e., along the line of one radius, to surround and compress the wear ring halves.

The foregoing specification has be written to enable those skilled in the art to make many modifications in the specific embodiments illustrated, to provide a seal and seal and tool system constructed in accordance with the present invention.

What is claimed as new and desired to be secured Letters Patent of the United States is:

1. A pusher seal assembly kit for sealing an annular gap between a housing and a rotatable shaft, the assembly kit comprising:
   a rotatable seal member for mounting on the rotatable shaft, the rotatable seal member having a sealing surface;
   a base member for mounting on the housing in a fixed position proximate the annular gap;
   a non-rotatable seal member for positioning between the base member and the rotatable shaft so as to encompass a circumferential surface of the rotatable shaft, the non-rotatable seal member being circumferentially adjustable and having a seal face configured for sealing engagement with the sealing surface of the rotatable seal member and a contact surface spaced from the seal face, the contact surface including at least one notch formed therein; and a spring member attached to the base member, the finger spring member having at least one finger element extending from the base member toward the rotatable shaft when the base member is fixed into position to bear against the contact surface for biasing the non-rotatable seal member axially along the rotatable shaft toward the rotatable seal member, wherein the non-rotatable seal member circumferentially adjusts for self-aligning engagement of the notch with the finger element to prevent rotation of the non-rotatable seal member.

2. The pusher seal assembly kit of claim 1, wherein the spring member includes a plurality of finger elements to bear against the contact surface for biasing the non-rotatable seal member axially along the rotatable shaft toward the rotatable seal member.

3. The pusher seal assembly kit of claim 2, wherein the notch is dimensioned to receive one of the plurality of finger elements to prevent rotation of the non-rotatable seal member.

4. The pusher seal assembly kit of claim 1, further comprising a spring retainer including a first portion for attaching the spring member to the base member and a second portion having a recess for allowing flexure of the finger element to permit limited movement of the non-rotatable seal member axially along the rotatable shaft.

5. The pusher seal assembly kit of claim 1, further comprising an adaptor for mounting the rotatable seal member on the rotatable shaft, the adaptor including a chamber for receiving an end of the rotatable seal member opposite the sealing surface and a packing element located between an inner wall of the chamber and an outer peripheral surface of the rotatable seal member, the end opposite the sealing surface having a circumferential ridge dimensioned to engage the packing element to retain the rotatable seal member within the chamber.

6. The pusher seal assembly kit of claim 5, wherein the outer peripheral surface of the rotatable seal member is tapered so the sealing surface has an outer diameter larger than the end opposite the sealing surface.

7. The pusher seal assembly kit of claim 1, wherein the rotatable seal member and the non-rotatable seal member each is split into at least two corresponding portions to facilitate assembly of each member around the rotatable shaft.

8. The pusher seal assembly kit of claim 7, wherein the base member and the spring member each is split into at least two corresponding portions to facilitate assembly of each member around the rotatable shaft.

9. The pusher seal assembly kit of claim 8, wherein the base member surrounds the circumferential surface of the rotatable shaft when fixed into position, the base member including a flanged surface for applying a radially compressive force to the non-rotatable seal member.

10. The pusher seal assembly kit of claim 8, wherein the spring member is a split annular diaphragm spring.

11. The pusher seal assembly kit of claim 7, further comprising a tool to assist in assembly of the rotatable seal member around the rotatable shaft, the tool including a substantially U-shaped collar member dimensioned to hold the corresponding portions of the rotatable seal member together around the rotatable shaft, the collar member including a radial surface for engagement against the sealing surface of the rotatable seal member and a flange member for supporting an outer peripheral surface of the rotatable seal member.

12. The pusher seal assembly kit of claim 7, further comprising a tool to assist in assembly of the non-rotatable seal member around the rotatable shaft, the tool including a substantially U-shaped collar member dimensioned to hold the corresponding portions of the non-rotatable seal member together around the rotatable shaft.

13. A method of sealing an annular gap between a housing and a rotatable shaft, the method comprising the steps of:

mounting a rotatable seal member having a sealing surface on the rotatable shaft;

fixing a base member on the housing in a fixed position proximate the annular gap;

positioning a non-rotatable seal member between the base member and the rotatable shaft so as to encompass a circumferential surface of the rotatable shaft, wherein the non-rotatable seal member is circumferentially adjustable and includes a seal face and a contact surface spaced from the seal face with at least one notch formed therein, the non-rotatable seal member being positioned so the seal face is aligned for sealing engagement with the sealing surface of the rotatable seal member; and attaching a spring member having at least one finger element to the base member, the finger spring member being attached so the finger element extends from the base member toward the rotatable shaft to bear against the contact surface for biasing the non-rotatable seal member axially along the rotatable shaft toward the rotatable seal member, wherein the non-rotatable seal member circumferentially adjusts for self-aligning engagement of the notch with the finger element to prevent rotation of the non-rotatable seal member.

14. The method of claim 13, wherein prior to the attaching step, the method includes the step of selecting a spring member having a plurality of finger elements as the spring member to be attached to the base member.

15. The method of claim 14, wherein the selecting step further includes selecting a split annular diaphragm spring as the spring member.

16. The method of claim 13, wherein the attaching step performed prior to the fixing step.

17. The method of claim 13, wherein the attaching step is performed using a spring retainer including a first portion for attaching the spring member to the base member and a second portion having a recess for allowing flexure of the finger element to permit limited movement of the non-rotatable seal member axially along the rotatable shaft.

18. The method of claim 13, wherein the mounting step is performed using an adaptor including a chamber for receiving an end of the rotatable seal member opposite the sealing surface and a packing element located between an inner wall of the chamber and an outer peripheral surface of the rotatable seal member, and further wherein the mounting step includes providing a circumferential ridge on the end opposite the sealing surface that is dimensioned to engage the packing element to retain the rotatable seal member within the chamber.

19. The method of claim 13, wherein the mounting step includes the steps of
utilizing a split seal member having at least two corresponding portions as the rotatable seal member to be mounted on the rotatable shaft, and
providing a tool having a substantially U-shaped collar member dimensioned for holding the corresponding portions of the rotatable seal member together around the rotatable shaft to assist in assembly of the rotatable seal member, the collar member having a radial surface for engagement against the sealing surface of the rotatable seal member and a flange member for supporting an outer peripheral surface of the rotatable seal member.

20. The method of claim 13, wherein the positioning step includes the steps of
utilizing a split seal member having at least two corresponding portions as the non-rotatable seal member to be positioned between the base member and the rotatable shaft, and
providing a tool having a substantially U-shaped collar member dimensioned for holding the corresponding portions of the non-rotatable seal member together around the rotatable shaft to assist in assembly of the non-rotatable seal member.

* * * * *

UNITED STATES PATENT AND TRADEMARK OFFICE
CERTIFICATE OF CORRECTION

PATENT NO. : 5,370,401
DATED : 12/6/94
INVENTOR(S) : Jan E. Sandgren

It is certified that error appears in the above-indentified patent and that said Letters Patent is hereby corrected as shown below:

Title page, and col. 1, line 3,
In the title, line 3, after "wear" insert --ring--.

Claim 16, column 6, line 50, after "step" insert --is--.

Signed and Sealed this

Fourteenth Day of February, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,370,401
DATED : December 6, 1994
INVENTOR(S) : Sandgren

It is certified that error appears in the above-indentified patent and that said Letters Patent is hereby corrected as shown below:

Claim 1, col. 5, line 8, delete "finger" (first occurence).

Claim 13, col. 6, line 32, delete "finger".

Signed and Sealed this

Second Day of January, 1996

Attest:

BRUCE LEHMAN

*Attesting Officer*    *Commissioner of Patents and Trademarks*